(12) United States Patent
Ota

(10) Patent No.: US 7,736,565 B2
(45) Date of Patent: Jun. 15, 2010

(54) PROCESS FOR PRODUCING PPE RESIN COMPOSITION

(75) Inventor: Yoshio Ota, Tokyo (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 928 days.

(21) Appl. No.: 11/126,402

(22) Filed: May 11, 2005

(65) Prior Publication Data
US 2006/0255498 A1 Nov. 16, 2006

(51) Int. Cl.
B29C 47/60 (2006.01)
(52) U.S. Cl. .................. 264/211.23; 264/211.21; 366/75; 366/76.91; 425/209
(58) Field of Classification Search .......... 425/209; 525/198, 241, 391; 264/211.23, 211.21; 366/75, 76.9, 76.91, 76.92, 76.93
See application file for complete search history.

(56) References Cited

U.S. PATENT DOCUMENTS

| 6,096,821 | A | 8/2000 | Adedeji et al. |
| 6,133,379 | A | 10/2000 | Yamagishi |
| 6,365,710 | B1 | 4/2002 | Wang et al. |
| 6,387,306 | B1 * | 5/2002 | Morohashi et al. ........ 264/102 |

FOREIGN PATENT DOCUMENTS

| GB | 2270029 A | * | 3/1994 |
| JP | 61-92811 | | 5/1986 |
| JP | 4-117444 | | 4/1992 |
| JP | 8-1665 | | 1/1996 |
| JP | 8-197609 | | 8/1996 |
| JP | 8-244026 | | 9/1996 |
| JP | 9-40858 | | 2/1997 |
| JP | 9-70872 | | 3/1997 |
| JP | 10-24483 | | 1/1998 |
| JP | 10-235643 | | 9/1998 |

(Continued)

OTHER PUBLICATIONS

Rosato, D.V., "Extruding Plastics: A Practical Processing Handbook", Jul. 23, 2001, Springer-Verlag, p. 217 & 629.*

(Continued)

Primary Examiner—Christina Johnson
Assistant Examiner—Galen Hauth
(74) Attorney, Agent, or Firm—Staas & Halsey LLP

(57) ABSTRACT

The invention provides process for producing a PPE resin composition containing PPE powder using an extruder comprising: a vent pipe; a polyphenylene ether (herein after referred to as "PPE") powder supplying pipe; an extruder supply hopper having an opening with a wall angle of 60° or more; and an extruder unit, wherein the vent pipe and the PPE powder supplying pipe each have an terminal orifice located in the opening of the extruder supply hopper, and wherein the PPE powder supplying pipe is disposed at a gear box-side portion of the extruder supply hopper, and the vent pipe is disposed at a die-side portion, relative to the PPE powder supplying pipe, of the extruder supply hopper, which process comprises the steps of: supplying the PPE powder to a gear box-side wall of the extruder supply hopper through the PPE powder supplying pipe; removing a gas accompanying the PPE powder in an effective amount through the vent pipe; and melt-kneading a mixture containing the degassed PPE powder with the extruder unit.

10 Claims, 3 Drawing Sheets

FOREIGN PATENT DOCUMENTS

| | | |
|---|---|---|
| JP | 11-165341 | 6/1999 |
| JP | 2000-108120 A | 4/2000 |
| JP | 3297523 | 4/2002 |
| JP | 3465969 | 8/2003 |
| JP | 2003-246865 | 9/2003 |

OTHER PUBLICATIONS

Office Action issued in corresponding Japanese Patent Application No. 2003-134922, on Dec. 7, 2007.

* cited by examiner

PROCESS FOR PRODUCING PPE RESIN COMPOSITION

FIELD OF THE INVENTION

PPE is a resin having excellent heat resistance, electric characteristic and flame retarding property and is an excellent resin as a material for OA and household electrical appliances and a material for automobiles. An example for the production of a PPE resin composition is a process for producing a PPE resin composition by a single melt-kneading of PPE powder and polystyrene resin or a flame retardant and another example is a process for producing a PPE resin composition where PPE powder of high concentration and polystyrene resin or a flame retardant are melt-kneaded to produce a PPE concentrate which is an intermediate material and the PPE concentrate is melt-kneaded again with polystyrene resin, etc. to produce a PPE resin composition.

The present invention relates to a production process which is excellent in productivity, stably supplies PPE powder, is well-balanced in physical properties of thermal deformation temperature and MFR, is suppressed in generation of foreign substances and is capable of improving impact resistance. The present invention also relates to a PPE resin composition prepared by the process.

BACKGROUND OF THE INVENTION

Background arts concerning methods for supplying powder to an extruder are as follows.

(1) A background art of mixing powder having different particle sizes by a powder stock hopper using an extruder equipped with a powder stock hopper is disclosed (e.g., Patent Document 1).

(2) A background art of providing a material supplying part and a degassing part in an extruder supply hopper and removing a gas in a resin material is disclosed (e.g., Patent Documents 2 and 3).

Background arts of producing a PPE resin composition are as follows.

(3) A background art screw configuration for enhancing PPE powder-conveying ability is disclosed (e.g., Patent Documents 4 and 5).

(4) A background art of degassing volatile components of PPE containing volatile components is disclosed (e.g., Patent Document 6).

(5) A background art for preventing the generation of non-melted PPE in a process for producing PPE concentrate is disclosed (e.g., Patent Document 7).

(6) A background art concerning flame-retarding PPE concentrate pellets where pellet size is 2 to 5 mm and a process for producing a PPE resin composition using the same is disclosed (e.g., Patent Document 8).

(7) A background art of subjecting a flame retardant to a divisional feeding is disclosed (e.g., Patent Document 9).

(8) A background art of regulating the particle size of a PPE concentrate and the amount of fine powder is disclosed (e.g., Patent Document 10).

(9) A background art of regulating the amount of fine powder of a flame-retarding PPE concentrate is disclosed (e.g., Patent Document 11).

(10) A background art, concerning melt-kneading of two kinds of PPE concentrates, of regulating the difference in heat-resisting temperatures between the PPE concentrates within 40° C. or less is disclosed (e.g., Patent Document 12).

Patent Document 1; JP 2000-108120 A
Patent Document 2; JP 11-165341 A
Patent Document 3; JP 08-197609 A
Patent Document 4: JP 09-070872 A
Patent Document 5: JP 10-024483 A
Patent Document 6: U.S. Pat. No. 6,133,379
Patent Document 7: JP 04-117444 A
Patent Document 8: Japanese Patent No. 3,297,523
Patent Document 9: Japanese Patent No. 3,465,969
Patent Document 10: U.S. Pat. No. 6,365,710
Patent Document 11: U.S. Pat. No. 6,096,821
Patent Document 12: JP 2003-246865 A There are two problems concerning an extrusion processing step for PPE powder.

One is a problem concerning handling of powder. PPE powder contains a lot of fine particles of not more than 100 μm and much gas and, therefore, when it is supplied to a supplying inlet port of an extruder, the conveying ability thereof significantly lowers and productivity greatly lowers. Further, since there are many fine particles in PPE powder, the powder is apt to cause blocking and is retained in a hopper wall or cause blocking in a stock hopper whereby the supply amount lowers or, reversely, it flows at a stroke whereby variations in the supply amount may become large.

The other problem is that the glass transition temperature of PPE is as high as 220° C. and its melt viscosity is also high and, therefore, temperature of a PPE composition for extrusion processing is as high as 300 to 360° C. Accordingly, foreign substances are apt to be generated in an extruder and, further, a rubber in a high-impact polystyrene (hereinafter abbreviated as "HIPS") is apt to be thermally deteriorated.

In recent years, there has been a demand for a production process which is excellent in productivity, stably supplies PPE powder, is well-balanced in physical properties of thermally deforming temperature and MFR, is suppressed in generation of foreign substances and is capable of impact resistance.

However, the background arts are not sufficient against such problems. The present inventors have already developed a screw mechanism for powder in Patent Documents 4 and 5 and increased the conveying ability of the PPE powder. However, PPE powder contains fine particles of not more than 100 μm in an amount of 5 to 99% by weight. In order to apply it to a producing machine, it is necessary to develop a method for supplying PPE powder that fluidizes powder, and prevents a dust explosion and generation of foreign substances. In order to supply the PPE powder in a stable manner and to enhance the conveying ability, it was found to be important an art where powder is firstly supplied from a temporarily storing hopper to a loss-in-weight feeder for powder, then supplied from the loss-in-weight feeder for powder to an extruder supply hopper and to an extruder whereupon the accompanying gas is removed therefrom.

Concerning the removal of gas from an extruder supply hopper, background arts of dividing the space into a material supplying part and a gas separating part is disclosed in Patent Documents 2 and 3. In these documents it is disclosed that, since gas accompanying the material supplied to the barrel of an extruder flows back from the barrel to the extruder supply hopper, the flown-back gas and supplying material are separated so that a conveying ability is enhanced. However, since PPE powder as addressed in the present invention suffers from a large amount of accompanying gas, there has been a demand for a technique of separating gas before supplying to an extruder barrel and, in addition, removing gas after the PPE powder is melt-kneaded.

SUMMARY OF THE INVENTION

An object of the present invention is to provide a process for producing a PPE resin composition, which is excellent in productivity, stably supplies PPE powder, is well-balanced in physical properties of heat distortion temperature and MFR, is suppressed in generation of foreign substances and is capable of improving impact resistance.

Another object of the present invention is to provide an extruder supply hopper which makes supply of a powder-containing mixture stable.

Other objects and effects of the present invention will become apparent from the following description.

The present inventor has conducted extensive investigations to solve the above-mentioned problems. As a result, the above-mentioned objects of the invention have been solved by providing the following production process and extrusion supply hopper.

A process for producing a PPE resin composition containing PPE powder using a co-rotating twin screw extruder comprising:

a vent pipe;

a polyphenylene ether (herein after referred to as "PPE") powder supplying pipe;

an extruder supply hopper having an opening with a wall angle of 60° or more; and an extruder unit, wherein the vent pipe and the PPE powder supplying pipe each have an terminal orifice located in the opening of the extruder supply hopper, and wherein the PPE powder supplying pipe is disposed at a gear box-side portion of the extruder supply hopper, and the vent pipe is disposed at a die-side portion, relative to the PPE powder supplying pipe, of the extruder supply hopper, which process comprises the steps of:

supplying the PPE powder to a gear box-side wall of the extruder supply hopper through the PPE powder supplying pipe;

removing a gas accompanying the PPE powder in an effective amount through the vent pipe; and melt-kneading a mixture containing the degassed PPE powder with the extruder unit.

An extruder supply hopper for supplying a powder-containing mixture, having a vent pipe and a powder supplying pipe, each having a terminal orifice located in an opening of the extruder supply hopper having a wall angle of 60 to 85°.

The production process of the present invention and a PPE resin composition produced thereby have advantages that the productivity is excellent, the supply of PPE powder is stable, the physical properties of thermal deforming temperature and MFR are well-balanced, generation of foreign substances is suppressed and impact resistance can be improved.

Figure 1:
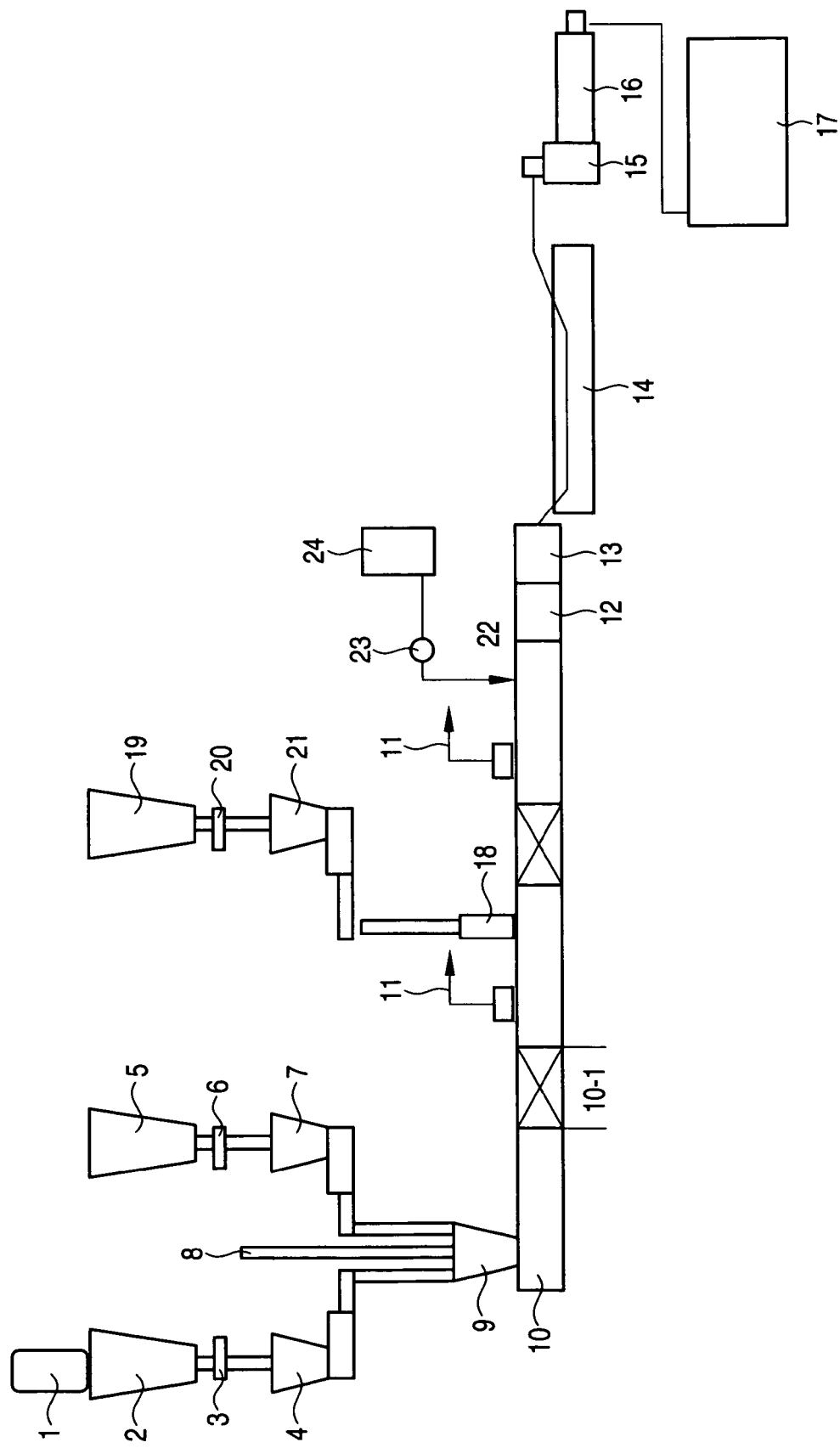
FIG. 1 is a schematic chart for showing an outline of apparatus for production of PPE resin composition and PPE concentrate concerning an example of the present invention.

The reference numerals used in the drawings denote the followings, respectively.

1: Flexible container for PPE powder
2: PPE powder stock hopper
2-1: Bug filter
2-2: Nozzle for injection of inert gas
3; Valve
4: Loss-in-weight feeder for PPE powder
4-1: Bug filter
5: Stock hopper for secondary raw material
6: Valve
7: Loss-in-weight feeder for secondary raw material
8: Vent pipe
8-1: Bug filter
9: Extruder supply hopper
9-1: Nozzle for injection of inert gas
10: Co-rotating twin screw extruder
10-1: Kneading zone for powder
11: Vent port
12: Screen changer
13: Die head
14; Strand bath
15; Pelletizer
16: Vibrating classifier
17: Flexible container
18: Side feeder hopper
19: stock hopper for secondary raw material
20: Valve
21: Loss-in-weight feeder for secondary raw material
22; Nozzle for injection of flame retardant
23: Feed pump for flame retardant
24: Tank for flame retardant
25; PPE powder supplying pipe

DETAILED DESCRIPTION OF THE PRESENT INVENTION

A co-rotating twin screw extruder of the present invention connected to an extruder supply hopper equipped with a vent pipe and a polyphenylene ether (hereinafter, referred to as PPE) powder supplying pipe is suitable for a process of producing where PPE powder is melt-kneaded. The extruder is able to be used not only for a process where a PPE resin composition is produced by a single kneading operation of PPE powder, but also for a process where a PPE concentrated is produced from PPE powder. The PPE concentrate is an intermediate material mainly comprising PPE to be used for the production of a PPE resin composition by melt-kneading, and resins other than PPE such as polystyrene resin, and a flame retardant, etc. are compounded in PPE in high concentrations.

With regard to an apparatus of the present invention, a representative example will be illustrated by referring to FIG. 1.

Reference numeral 1 is a flexible container for PPE powder; 2 is a PPE powder stock hopper; 3 is a valve; 4 is a loss-in-weight feeder for PPE powder; 8 is a vent pipe; 9 is an extruder supply hopper; 10 is a co-rotating twin screw extruder; 11 is a vent port; 12 is a screen changer; 13 is a die head; 14 is a strand bath; 15 is a pelletizer; 16 is an vibrating classifier; 17 is a flexible container; 18 is a side feeder hopper (side feeding inlet port); 5 and 19 are stock hoppers for secondary raw materials; 6 and 20 are valves; 7 and 21 are loss-in-weight feeders for secondary raw materials; 22 is a nozzle for injection of a flame retardant; 23 is a feed pump for a flame retardant; 24 is a tank for a flame retardant; and 10-1 is a first kneading zone.

Figure 2:
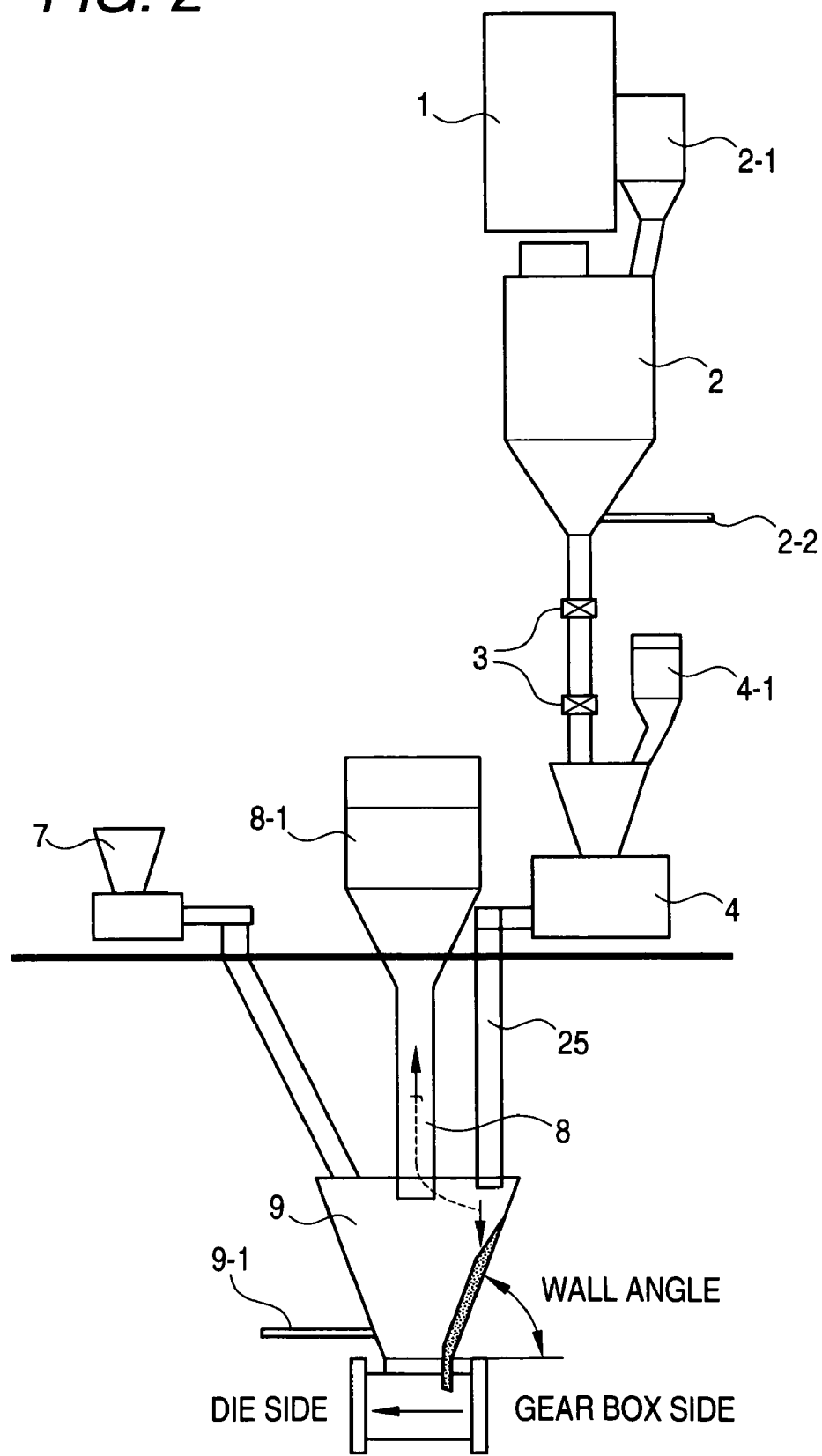
FIG. 2 is a schematic chart for showing an outline of apparatus for supplying PPE powder concerning an example of the present invention.

Now, the second step in a process for producing a PPE concentrate will be illustrated by referring to FIG. 2.

Reference numeral 25 is a stock hopper of a PPE concentrate produced using an apparatus of FIG. 1; 26 is a valve; 27 is a loss-in-weight feeder for a PPE concentrate; 28 is an extruder supply hopper; 29 is a low-in-weight feeder for a secondary raw material; 30 is an extruder; 31 is a vent port; 32 is a die head; 33 is a strand bath; 34 is a pelletizer; 35 is an vibrating classifier; 37 is a loss-in-weight liquid-adding pump; and 38 is a tank for a flame retardant.

Figure 3:
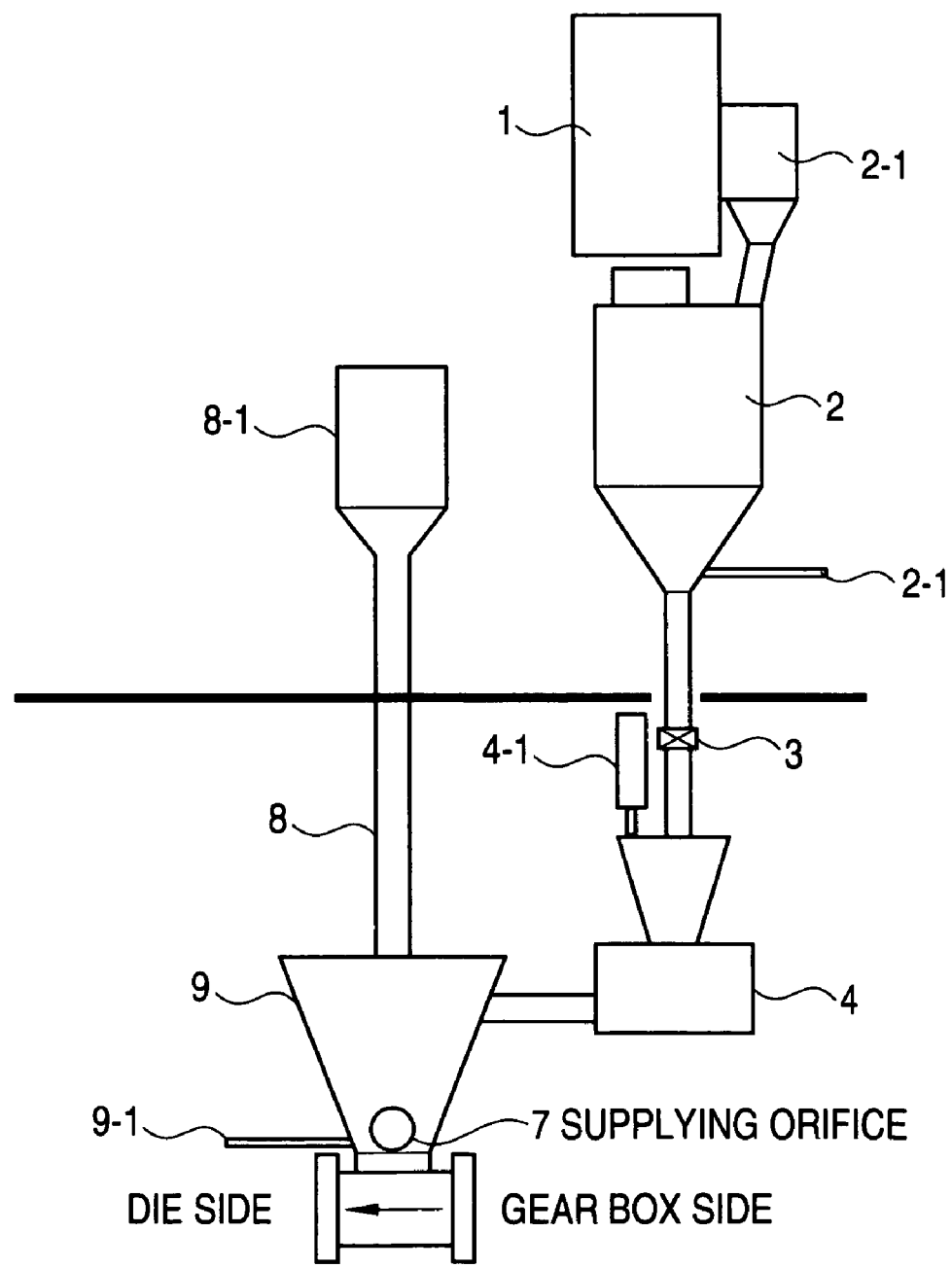
FIG. 3 is a schematic chart for showing an outline of apparatus for supplying PPE powder concerning an example of the present invention.

The production process of the present invention where PPE powder is handled will be illustrated in detail by referring to FIGS. 1, 2 and 3.

Reference numerals 1 to 6 and 8 to 10 of FIG. 1 of the present invention will be illustrated by referring to FIGS. 2 and 3.

A stock hopper for PPE powder 2 is placed at the highest position. Volume of the hopper part is 0.2 to 200 m$^3$ and, preferably, 0.4 to 20 m$^3$. When it is less than 0.2 m$^3$, conveying times to a feeder increases while, when it is more than 200 m$^3$, the device becomes too large. Lower part of the stock hopper is a cone-like shape and angle of the cone is preferably not less than 60° and, particularly preferably, 60 to 85°. When the cone angle is more than 60°, the powder is hardly stored on the wall. When it is less than 85°, bulk density of the PPE powder falling upon supplying to a loss-in-weight feeder hardly lowers.

Inert gas is supplied from a nozzle, etc. installed at the lower part of the cone of 2-2. The inert gas is nitrogen gas or carbon dioxide gas and, preferably, it is nitrogen gas. The concentration of oxygen in inert gas is less than 2.0% by weight and, preferably, less than 0.01% by weight. The concentration of oxygen in the stock hopper is less than 15% by weight and, preferably, less than 8% by weight. When the concentration of oxygen is less than 15% by weight, generation of foreign substances is little. A representative example of a nitrogen generation apparatus is an apparatus such as Pressure Swing Absorption where liquid nitrogen is evaporated in which oxygen in air is adsorbed whereby nitrogen concentration is increased. In measuring the oxygen concentration, an oxygen concentration meter of a diaphragm galvanic cell manufactured by Yokogawa, Japan, a magnetic oxygen concentration meter and an oxygen concentration meter of a limiting current type may be used for example. A bug filter of 2-1 is used for separation of inert gas and powder. Incidentally, it is recommended that purge of inert gas is conducted, if necessary, with respect to a hopper of the loss-in-weight feeder 4, a hopper of the side feeder 18 and a vent port 11 as well.

A valve 3 positioned between a PPE powder stock hopper and a loss-in-weight feeder for PPE powder 4 is a method for supplying to a pipe using rotary valve and/or shut-off valve. When the amount of PPE powder in a hopper of a loss-in-weight feeder 4 for PPE powder becomes a lower limit, the valve opens by an ON signal whereupon PPE powder is supplied from a stock hopper 2 to a hopper of a loss-in-weight feeder 4. When a predetermined weight of material comes into a hopper of a loss-in-weight feeder 4, an OFF signal is sent out, a shut-off valve is closed and supply of PPE powder is stopped. A mechanical conveying apparatus such as a screw may be used instead of a valve 3. With regard to the height from the lowest part of 2 to the upper part of the hopper 4, the shorter, the better. The length of a pipe between 2 and 4 is not more than 20 m, preferably not more than 10 m, more preferably not more than 5 mm and, still more preferably, not more than 1 m. When a falling distance of PPE powder is within 20 m, it is possible to make a reduction in bulk density of the PPE powder little.

A loss-in-weight feeder for PPE powder 4 of the present invention is an apparatus where decrease of PPE powder weight with lapse of time is measured by a load cell and a predetermined flow rate is supplied. Its examples are loss-in-weight feeders manufactured by K-TRON (Switzerland), Bravender, Acrison (USA) and Kubota (Japan). The apparatus is placed between a PPE powder stock hopper 2 and an extruder supply hopper 9. On the upper part of a loss-in-weight feeder 4, it is preferred to attach a bug filter 4-1 which filters gas and PPE powder or a pressure equalization pipe between stock hopper 2 and loss-in-weight feeder 4. The screw for a conveying part of the loss-in-weight feeder 4 is a single screw of an auger type, a single spiral screw, a twin screw of an auger type, a intermeshing co-rotating twin screw, and preferably is a single screw of an auger type or a intermeshing co-rotating twin screw.

The extruder supply hopper 9 of the present invention will be illustrated. The extruder supply hopper used in the present invention is a hopper which supplies materials (such as powder and pellets) being necessary to be melt-kneaded from a gear box side (the most upper stream side) of an extruder to an extruder when a resin composition is prepared by melt-kneading using an extruder. As shown in FIGS. 2 and 3, on the upper part of the supplying hopper 9, a PPE powder supplying pipe is placed on a gear box side from a loss-in-weight feeder 4 and a vent pipe for degassing is placed on a down stream side thereof (die side) and, on further down stream side thereof (die side), a supplying pipe for thermoplastic resin other than PPE is placed. The angle of the PPE powder supplying pipe is 60 to 90° and, preferably, 70 to 85°. When the angle of the PPE powder supplying pipe is more than 60° or more, PPE powder is hardly retained in the pipe. The length of the PPE powder supplying pipe is not more than 10 m and, preferably, not more than 2 m. More preferably, as shown in FIG. 3, it is acceptable that the screw of a loss-in-weight feeder 4 contacts to the wall of the gear box side of an extruder supply hopper whereby PPE powder is directly supplied. The supplying pipe for a thermoplastic resin other than PPE may be at the lower part of the hopper. Inclination angle of the hopper wall is 60 to 85° and, preferably, 65 to 80°. When the angle of the hopper is 60° or more, PPE powder is hardly retained on the wall when it is 85° or less, poor supplying to an extruder screw caused by a decrease in apparent density due to non-flowing of PPE powder on the wall hardly takes place. The shape of the hopper may be any of reversed conical and angular. In the case of an angular shape, powder is supplied from an upper stream side (gear box side) of an extruder supply opening to an extruder when powder is supplied to the side of gear box. In the case of a reversed conical shape, it is preferred that a guide board is placed on the wall so that PPE powder discharged from an outlet of supplying pipe to an upper stream side of an extruder supply opening and/or a side of barrel in the direction of rotation of a screw. When the order of installed positions of the PPE powder supplying pipe and of vent pipe is reversed, the bulk density of the PPE powder becomes small and, in addition, the PPE powder is supplied to down stream from the center of the extruder supply opening whereby supply of the PPE powder to the screw lowers. It is a characteristic that, in the hopper, there is no partition for making a PPE supplying zone and a degassing chamber. When a partition is formed, degassing becomes rather poor whereby changes in the supply amount take place or, due to a poor degassing, the supply of PPE powder to an extruder screw becomes bad.

It is preferred that inert gas 9-1 is injected from an injection nozzle to the wall of the extruder supply hopper so as to reduce the oxygen concentration in the extruder supply hopper to an extent of less than 6% by weight. Preferably, it is less than 2% by weight and, more preferably, less than 1% by weight. When the PPE powder with an oxygen concentration of less than 6% by weight is melt-kneaded, generation of large amount of foreign substances and deterioration of impact resistance and fluidity, which are apt to take place due to high resin temperature, can be suppressed.

A vent pipe 8 of the present invention is a pipe for removal of gas contained in the PPE powder. Since the vent pipe is placed at the down stream side of the PPE powder supplying pipe, degassing is easy. The angle of the vent pipe is 70 to 90° and, preferably, 75 to 90°. When the angle of the vent pipe is less than 70°, the PPE powder retains in the pipe. The height of the pipe is preferred to be not less than 1 m. It is preferred that a bug filter is attached to the front end to separate the powder and the gas. It is necessary that area of the bug filter is made to such an extent that pressure in the extruder supply hopper becomes 0.05 MPa or less. Incidentally, it is also acceptable that a bug filter is not attached but a pipe is made high and gas is removed.

The extruder 10 of the present invention is preferred to be a co-rotating twin screw extruder and suitable examples thereof include ZSK Series manufactured by Coperion (Germany), TEM Series manufactured by Toshiba (Japan) and TEX Series manufactured by Nippon Seikosho. In melt-kneading of PPE powder, an extruder of a high torque type is preferred because PPE has a high melt viscosity. Suitable examples thereof include, for example, Mega compounder of ZSK, SS Series of TEM and α2 Series of TEX. The ratio of long diameter to short diameter of an extruder 10 is 1.40 to 1.80 and, preferably, 1.45 to 1.65. With regard to the size of the extruder 10, the long diameter of the screw D is preferred to be 40 to 200 mm. Production amount of extruders where D is less than 40 mm is small. In extruders where D is more than 200 mm, heat generation upon melt-kneading is apt to become large. The length of the extruder is preferred to be L/D of 17 to 60. When the length of the extruder is shorter than L/D of 17, extrusion of the PPE powder is difficult. When L/D is more than 60, deviation of a screw shaft is apt to become large.

Preferred barrel configuration of the extruder 10 of the present invention comprises a supplying barrel connecting to an extruder supply hopper, a barrel used for solid conveyance which conveys PPS powder and/or thermoplastic resin other than PPE, a barrel having a first kneading zone 10-1, a first vent barrel having a vent 11, a first side feed barrel, a barrel having a second kneading zone which melts and kneads the material being subjected to the first side feeding, a second vent barrel having a vent 11, an injection barrel or an intermediate plate for addition of a liquid flame retardant, a barrel for conveying melted resin to a die, screen changer 12 and die 13. When there are two side feedings, a second side feed barrel and a barrel having a third kneading zone where the materials subjected to the second side feeding is melt-kneaded may be formed between the down stream side of the second kneading zone and the second vent barrel.

The extruder 10 of the present invention and equipments thereto will be illustrated.

In an extruder powder conveying zone uses single lighted screw elements where a pitch (screw length when a screw rotates to an extent of 360°) is L/D of 1.0 or more and uses not less than one barrel or, preferably, not less than two barrels.

In the first kneading zone 10-1 of the present invention, L/D=2 or more and, when L/D is less than 2, insufficient melt-kneading are apt to be resulted. In the screw configuration of the kneading zone, it is preferred to use forward pitch-kneading blocks and neutral pitch-kneading blocks and reverse pitch-kneading blocks or reverse pitch-flight screw elements in combination when a PPE concentration is less than 45% by weight. When a PPE concentration is 45% by weight or more, a combination of forward pitch-kneading blocks and neutral pitch-kneading blocks as the screw configuration of Patent Documents 4 and 5 for example is most preferred.

In the down stream of the first kneading zone, there is a first vent 11 for degassing and, with regard to a screw element, a screw where a forward pitch is L/D of 0.8 or more is used. With regard to vent pressure, it may be open to air or vacuum. Preferred range of degree of vacuum is 50 to 750 mmHg and a more preferred range is 100 to 500 mmHg.

Then, there is at least one side feeder 18 which side-feeds the resin, and melt-kneading is conducted where the lengths of the second, third, . . . kneading zone are L/D of 2.5 or more. The resin to be side-fed resin or reinforcing material, additive, solid flame retardant, etc. is/are supplied into a stock hopper 19, placed into a hopper of a loss-in-weight feeder 21 by opening/closing of a valve 20 and a predetermined amount is supplied. It is also acceptable that plural weight feeders are used for supplying to a side feeder 18.

At the down stream side of a side feed kneading zone, there is a second vent port 11 and, with regard to a screw element, a screw where a forward pitch is L/D of 0.8 or more is used. With regard to vent pressure, it may be open to air or vacuum. Preferred range of the degree of vacuum is 50 to 750 mmHg and a more preferred range is 100 to 500 mmHg.

When a liquid flame retardant is further added, the liquid flame retardant is placed in a tank 24 and injected into an extruder from a loss-in-weight feed pump 23 using a nozzle for injection of the flame retardant. At the down stream side of the second vacuum vent port, a kneading zone for the liquid flame retardant may be installed. The length of the kneading zone is L/D of 0.5 or more and, with regard to a screw element, it is possible to use forward, reverse and neutral pitch-kneading blocks, forward pitch-flight cut screw elements and reverse pitch-flight cut screw elements. When the adding amount of a liquid additive is too much, it may be fed dividedly. For example, it is acceptable that division is done using a side feeder of upper stream side of the second vent port 11 and is fed. In order to make handling of the liquid flame retardant convenient, it is preferred that flame retardant tank 24, pump 23 and pipe thereof are heated at a predetermined temperature within a range of 50 to 120° C. since the viscosity of the flame retardant becomes stable and imbalance in the supply amount becomes small thereby.

In the down stream side of the extruder of the present invention, there is a screen changer 12 and foreign substances, etc. are filtered by attaching a metal mesh to a breaker plate. In the screen changer, there are a fixed type where an extruder is stopped whenever a mesh is exchanged and an automatic type where a screen is exchanged upon operation of an extruder. If possible, an automatic type is preferred because it is able to conduct a continuous production. In an automatic type, there are a system where two screen meshes are installed to a plate of a flat board in a horizontal direction and screen mesh is switched by moving the plate in a transverse direction, a system where two series of screen meshes are installed upside and downside and switching is conducted at upside and downside separately, and a system where a few screen meshes are installed on circumference of a disk and switching is conducted while rotating. Although any of them may be used, a screen changer of a plate type is particularly preferred.

Preferred range of the area of the screen mesh is 1 to 30 $mm^2/kg/H$ and more preferred range is 5 to 25 $mm^2/kg/H$.

When the screen area is 1 mm²/kg/H or more, a phenomenon where foreign substance are immediately clogged and switching times increase hardly happens whereby the productivity hardly lowers. When it is 30 mm²/kg/H or less, the volume of a screen changer does not become too large whereby retention time does not become too long and impact resistance of a PPE resin composition hardly lowers.

With regard to the mesh size of the screen mesh, No. 10 to No. 300 can be used and they may be used by freely combining them. For example, a combination of No. 50, No. 20, No. 100, No. 50 and No. 100 or a combination of No. 20, No. 50, No. 100, No. 50 and No. 10, etc. from upper stream to down stream are possible. When a reinforcing material is added, screen mesh is clogged and, therefore, it is detached in use.

In the present invention, there are many holes of 2.0 to 7.0 mm called die plate opening at the front end of a die head. The number of holes is determined in terms of 5 to 100 kg/H per hole. In the case of a strand cut, foreign substances (viscous substances) attach around the holes of the die plate wherefrom strand comes out and, in order to remove them, it is preferred to remove in such a manner that a heater is placed in the die plate, the temperature is set at resin temperature ±10° C. and compressed air and nitrogen gas of a flow rate of 10 to 100 m/second are applied for each strand.

The cutting method of the present invention includes a strand cut system where a strand is cooled in a strand bath 14 and cut by a pelletizer 15; a system where a strand is conveyed by a belt conveyer instead of a strand bath, mist is sprayed onto the strand to cool by means of heat of evaporation and cutting is done by a pelletizer; a system where, instead of a strand bath, a strand is flown downward on a slope of a height of about 3 mm to cool and conveyed by water stream and the cutting is done by a pelletizer; a hot-cut system where a cutter is installed on a die part and the resin in a hot state coming out from the hole is cut; and an underwater cut system where the resin coming out from the hole is cut in water. Any of them may be used or other system may be also used for the PPE resin composition of the present invention.

In the PPE resin composition of the present invention, a strand is cut by a pelletizer 15 to make into pellet. A pellet is in a shape of column, sphere or prism and a set value for an aimed average size to be cut is 1 to 6 mm×1 to 6 mm. Preferably, it is 2 to 5 mm×2 to 5 mm and, more preferably, it is 2 to 5×3.1 to 5 mm. When an aimed cutting value is set at less than 1 mm, it is not possible to discriminate by a vibrating classifier 16. On the other hand, a pellet of more than 6 mm is apt to cause poor melt-kneading by a molder screw or an extruder screw. The vibrating classifier 16 removes longer, larger and shorter pellets than the aimed pellet size and cutting dust of 0.1 mm or smaller which is called cut powder. Particularly when cut powder adheres to a molder and wall of an extruder supply hopper, its cleaning is troublesome and that is a cause of claims from customers. Therefore, as a measure for suppressing the generation of cut dust, merchants in charge thereof are doing measures such as that material for cutter blade and attaching angle are duly selected, cutter blade is well maintained and controlled, strand is made at 100 to 150° C. and cut by a pelletizer and, since pellet is hot, a pellet cooling device is installed so that no thermal deterioration takes placed. Pellets selected by the sieve are mixed, if necessary with an outer moisturizer and then placed in a flexible container 17 and sent out to the market.

In the operation condition for melt-kneading of the PPE powder of the present invention, the revolution is 100 to 1,200 rpm and, preferably, 110 to 900 rpm. When it is less than 100 rpm, productivity lowers while, when it is more than 1,200 rpm, too much heat is generated. The temperature set for a barrel is 220 to 350° C. and, preferably, 250 to 340° C. When the temperature set for the barrel is lower than 220° C., torque of an extruder rises while, when it is higher than 350° C., generation of foreign substances increases.

With regard to an apparatus for producing a PPE resin composition using a PPE concentrate of the present invention, any of single screw extruder and co-rotating twin screw extruder may be used. A co-rotating twin screw extruder is particularly preferred. The PPE concentrate and polystyrene resin are supplied to an extruder supply hopper of an extruder. When a flame retardant is supplied, it is preferred to supply from the side of an extruder or from an extruder supply hopper. Especially when a flame retardant is supplied in a liquid form, the flame retardant is placed in a tank and supplied from an extruder side using a pump and a nozzle for injection of liquid additives. The operation condition for an extruder using a PPE concentrate of the present invention is as follows.

The revolution is 100 to 1,200 rpm and, preferably, 110 to 900 rpm. When it is less than 100 rpm, productivity lowers while, when it is more than 1,200 rpm, too much heat is generated. The temperature set for a barrel is 220 to 350° C. and preferably, 230 to 300° C. When the temperature set for the barrel is lower than 220° C., torque of an extruder rises while, when it is higher than 350° C., production of foreign substances increases.

Now, the resin composition used for the present invention will be illustrated.

Examples of the PPE powder used in the present invention are poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether). In addition, copolymers of 2,6-dimethylphenol with other phenol (such as 2,3,6-trimethylphenol or 2-methyl-6-butylphenol) are preferred as well. Among them, poly(2,6-dimethyl-1,4-phenylene ether) and a copolymer of 2,6-dimethylphenol with 2,3,6-trimethylphenol are preferred and poly(2,6-dimethyl-1,4-phenylene ether) is particularly preferred.

The static bulk density of the PPE powder of the present invention is 400 to 700 kg/m³. When it is less than 400 kg/m³, liquefaction of the powder is apt to take place while, when it is more than 700 kg/m³, PPE becomes too hard, melting becomes difficult and generation of non-melted substance is apt to take place. The average particle size is preferred to be 30 to 600 μm. When it is less than 30 μm, liquefaction of the powder is apt to take place while, when it is more than 600 μm, generation of non-melted substance is apt to take place. The average particle size of the PPE powder of the present invention is a value which is measured by a Coulter counter measuring machine, a laser diffraction particle size meter, etc.

The reduced viscosity is ηsp/c of 0.35 to 0.6 (unit: g/dl; a solution in chloroform; measured at 30° C.). When it is less than 0.35, impact resistance greatly lowers while, when it is more than 0.6, melt viscosity becomes too high.

The molecular weight distribution of the PPE of the present invention as measured by a gel permeation chromatography in terms of ratio of (weight-average molecular weight)/(number-average molecular weight) is 2.0 to 3.5 and, preferably, 2.1 to 3.2

An organic solvent in the PPE of the present invention is 0.01 to 2.5% by weight, preferably 0.03 to 2% by weight and, more preferably, 0.05 to 0.7% by weight. When the organic solvent in the PPE is less than 0.1% by weight, melting of the PPE powder becomes difficult and generation of non-melted substances is apt to take place. When it is more than 2.5% by weight, the organic solvent is heated in a barrel of an extruder, evaporated gas comes back to an extruder supply hopper and degassing becomes difficult. With regard to an additive to endow PPE with a functional group, 0.1 to 5% by weight of maleic acid, fumaric acid, itaconic acid, maleic acid anhydride, malic acid, citric acid, etc. may be used. One of them or two or more thereof in combination may be used.

Examples of the thermoplastic resin other than PPE used in the present invention are polystyrene resin (general-purpose polystyrene (hereinafter, abbreviated as GPPS), a random copolymer of styrene with acrylonitrile, HIPS, etc.), a block copolymer of styrene with conjugated diene (a block copolymer of styrene with butadiene and a block copolymer of styrene with isoprene) and hydrogenated products thereof, polyethylene resin (low-density polyethylene resin, linear low-density polyethylene resin and ethylene-octene copolymer resin preferably having a density of 700 to 930 kg/m$^3$), polypropylene resin, polyamide resin (Nylon 6, Nylon 66, Nylon 610, half-aromatic Nylon, etc.), polycarbonate, homopolyoxymethylene, copolymer polyoxymethylene, polyphenylene sulfide, polyester resin (such as polybutylene terephthalate and polyethylene terephthalate), polypropylene resin and polyphenylene sulfite. One or more of those resins may be used and combinations with other resin may be used as well.

In the thermoplastic resin other than PPE of the present invention, preferred thermoplastic resin other than PPE is a polystyrene resin of GPPS and HIPS. The melt flow rate value (at 200° C. with a load of 5 kg) thereof is preferably 0.1 to 15 g/10 minutes and, more preferably, 0.5 to 10 kg/10 minutes. Preferred average rubber particle size in HIPS is 0.5 to 5 µm and, more preferably, 0.8 to 2.5 µm. When it is smaller than 0.5 µm, impact resistance greatly lowers while, when it is larger than 5 µm, appearance of molded product is significantly deteriorated. Preferred rubber concentration in HIPS is 5 to 15% by weight and, more preferably, 6 to 13% by weight. When it is less than 5% by weight, impact resistance is low while, when it is more than 15% by weight, viscosity of HIPS is too high. GPPS and HIPS may contain 0.1 to 4% by weight of mineral oil.

Examples of the flame retardant used in the present invention are a phosphate type flame retardant such as triphenyl phosphate, phenyl bisdodecyl phosphate, phenyl bisneopentyl phosphate, phenyl-bis(3,5,5'-trimethylhexyl phosphate), ethyl dipheriyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, di(dodecyl)p-tolyl phosphate, tricresyl phosphate, dibutylphenyl phosphate, 2-chloroethyl diphenyl phosphate, p-tolyl bis(2,5,5'-trimethylhexyl)phosphate, 2-ethylhexyl diphenyl phosphate, 2,2-bis{4-[bis(methylphenoxy)phosphoryloxy]phenyl}propane, (3-hydroxyphenyl) diphenyl phosphate, resorcinol bis(diphenyl phosphate), 2-naphthyl diphenyl phosphate, 1-naphthyl diphenyl phosphate and di(2-naphthyl)phenyl phosphate.

The PPE resin composition comprising PPE powder and thermoplastic resin composition other than PPE according to the present invention contains 20 to 90% by weight, preferably 25 to 95% by weight, more preferably 30 to 80% by weight of PPE powder and 80 to 1% by weight, preferably 75 to 5% by weight, more preferably 70 to 20% by weight of thermoplastic resin other than PPE. When the PPE powder is less than 20% by weight, the properties of the PPE are not available. When the thermoplastic resin other than PPE is less than 1% by weight, the fluidity significantly lowers. When two or more kinds of thermoplastic resins as such other than PPE are supplied, all of the two or more kinds of thermoplastic resins other than PPE may be supplied from an extruder supply hopper or resins may be divided into the supplying hopper and side feed. Even in the case of one kind of thermoplastic resin other than PPE, it may be divided into a supplying hopper and a side feed. A specific example is that PPE powder, a hydrogenated product of styrene-butadiene block copolymer and maleic acid anhydride or citric acid or peroxide are supplied to an extruder supply hopper while a polyamide resin is supplied from the upper stream side feeder.

A PPE resin composition produced by a single step comprising PPE powder and polystyrene resin according to the present invention contains 20 to 99 parts by weight, preferably 25 to 95 parts by weight, more preferably, 30 to 80 parts by weight of PPE powder, and 80 to 1 part(s) by weight, preferably 75 to 5 parts by weight, more preferably, 70 to 20 parts by weight of polystyrene resin. When the PPE powder is less than 20 parts by weight, the properties of PPE are not available. When the polystyrene resin is less than 1 part by weight, the fluidity significantly lowers. With regard to the polystyrene resin, GPPS and HIPS may be used together or HIPS may be used singly. A method for supplying the polystyrene resin is that, when the PPE powder is 50 parts by weight or more and the polystyrene resin is less than 49 parts by weight, all of them may be supplied from an extruder supply hopper. Preferred method of supplying is as follows. Per 100 parts by weight of the PPE powder, the amount of the polystyrene resin supplied to an extruder supply hopper is 10 to 90 parts by weight, preferably 10 to 85 parts by weight and, more preferably, 15 to 80 parts by weight. The residual polystyrene resin is supplied from a side feeder of at least one place.

A PPE resin composition produced by a single step comprising PPE powder, a polystyrene resin and a flame retardant according to the present invention contains 20 to 99 parts by weight, preferably 25 to 95 parts by weight, more preferably 30 to 80 parts by weight of PPE powder, and 80 to 1 part(s) by weight, preferably 75 to 5 parts by weight, more preferably 70 to 20 parts by weight of polystyrene resin. The amount of the flame retardant per 100 parts by weight of the resin is 3 to 30 parts by weight, preferably 4 to 28 parts by weight, more preferably 4 to 25 parts by weight. When the amount of the PPE powder is less than 20 parts by weight, the properties of PPE are not available. When the polystyrene resin is less than 1 part by weight, the fluidity significantly lowers. When the flame retardant is more than 30 parts, heat resistance lowers while, when it is less than 3 parts, flame retarding property lowers. With regard to the polystyrene resin, GPPS and HIPS may be used together or HIPS may be used singly. A method for supplying the polystyrene resin is that, when the PPE powder is 50 parts by weight or more and the polystyrene resin is less than 49 parts by weight, all of them may be supplied from an extruder supply hopper. Preferred method of supplying is as follows. Per 100 parts by weight of the PPE powder, the amount of the polystyrene resin supplied to an extruder supply hopper is 10 to 90 parts by weight, preferably 10 to 85 parts by weight, more preferably 15 to 80 parts by weight. The residual polystyrene resin is supplied from a side feeder of at least one place. With regard to a method of supplying the flame retardant, it may be supplied from an extruder supply hopper or from a side feeder when the form is solid at ambient temperature. In the case of a flame retardant melting at about 50° C. such as triphenyl phosphate, it is preferred to heat and the resulting liquid is subjected to a side feeding. When the form is liquid at ambient temperature, the position for side feeding from at least one side feed orifice is preferred to be a down stream side of the second vent port but it may be between the first vent and the second vent as well.

The PPE concentrate containing no flame retardant according to the present invention contains 51 to 99 parts by weight, preferably 60 to 95 parts by weight, more preferably 65 to 90 parts by weight of PPE powder and 49 to 1 part(s) by weight, preferably 40 to 5 parts by weight, more preferably 45 to 10 parts by weight of polystyrene resin. When the PPE powder is less than 51 parts by weight, non-melted product of the PPE powder is generated while, when it is more than 99 parts by weight, the fluidity lowers. Preferred method of supplying the polystyrene resin is that, per 100 parts by weight of PPE powder, 10 to 80 parts by weight, preferably 10 to 70 parts by weight of polystyrene to be supplied to an extruder supply hopper is supplied while the remaining polystyrene resin is side fed from at least one side feed orifice. In the PPE concentrate containing no flame retardant, the amount of the PPE concentrate used decreases when PPE concentration is high and, therefore, that is preferred because cost for transportation can be reduced and kinds of the PPE concentrate can be decreased.

The PPE concentrate containing a flame retardant according to the present invention contains 51 to 99 parts by weight, preferably 60 to 95 parts by weight of PPE powder, and 49 to 1 part(s) by weight, preferably 40 to 5 parts by weight of polystyrene resin. When the PPE powder is less than 51 parts by weight, non-melted substance of PPE powder is generated while, when it is more than 99 parts by weight, the fluidity lowers. When the flame retardant is less than 6 parts by weight, the flame retarding property lowers while, when it is more than 50 parts by weight, the heat resistance becomes too low. Preferred method of supplying the polystyrene resin is that, per 100 parts by weight of PPE powder, 10 to 80 parts by weight, preferably 10 to 70 parts by weight of polystyrene to be supplied to an extruder supply hopper is supplied while the remaining polystyrene resin is side fed from at least one side feed orifice. Preferred method for supplying a flame retardant is that 6 to 50 parts by weight of a flame retardant is side fed from at least one side feed orifice. In the PPE concentrate containing a flame retardant, the amount of the PPE concentrate used decreases when the PPE concentration is high and the flame retardant concentration is high and, therefore, that is preferred because the cost for transportation can be reduced and kinds of the PPE concentrate can be decreased.

It is possible to produce a PPE resin composition comprising PPE and polystyrene resin via the PPE concentrate of the present invention.

The PPE resin composition produced via the PPE concentrate of the present invention contains 35 to 98 parts by weight, preferably 40 to 95 parts by weight of at least one kind of PPE concentrate containing no flame retardant, and 65 to 2 parts by weight, preferably 60 to 5 parts by weight of polystyrene resin.

The PPE resin composition produced via the PPE concentrate of the present invention contains 35 to 98 parts by weight, preferably 40 to 95 parts by weight of at least one kind of PPE concentrate containing no flame retardant, 65 to 2 parts by weight, preferably 40 to 95 parts by weight of polystyrene resin, 65 to 2 parts by weight of polystyrene resin, and 3 to 30 parts by weight, preferably 5 to 28 parts by weight of a flame retardant.

The PPE resin composition produced via the PPE concentrate according to the present invention contains 35 to 98 parts by weight, preferably 40 to 95 parts by weight in total of at least one kind of PPE concentrate containing a flame retardant and at least one kind of PPE concentrate containing no flame retardant, and 65 to 2 parts by weight, preferably 60 to 5 parts by weight of polystyrene resin.

The following additive(s) may be added to the resin composition of the present invention in the step for producing the PPE resin composition.

Thus, heavy calcium carbonate, colloidal calcium carbonate, soft calcium carbonate, silica, kaolin, organized clay, clay, barium sulfate, zinc oxide, alumina, magnesium hydroxide, talc, mica, glass flake, hollow glass flake, hydrotalcite, needles-shaped filler (such as wollastonite, potassium titanate, basic magnesium sulfate, seplite, xonotolite and aluminum borate), glass beads, silica beads, alumina beads, carbon beads, glass balloon, metallic conductive filler, non-metallic conductive filler, carbon, magnetic filler, piezoelectric/pyroelectric filler, slidable filler, filler for sealing, ultraviolet absorptive filler, filler for oscillation control, conductive filler (such as Ketjenblack, acetylene black and carbon nanotube), glass fiber, carbon fiber, metal fiber, etc. may be used as a reinforcing agent. They may be used in combination and, although it is possible to supply from an extruder supply hopper side, a fibrous reinforcing material is preferred to be subjected to a side feeding. The amount to be added is 5 to 70 parts by weight and, preferably 10 to 60 parts by weight. It is also possible to use silicon additive, amine additive, etc. as a surface treating agent for such a reinforcing agent.

In the PPE resin composition of the present invention, oil of paraffin type, naphthene type, silicon type, etc. may also be used if necessary.

If necessary, plasticizer, various kinds of coloring agents, coloring enhancing agent (such as titanium oxide), ultraviolet absorber, antistatic agent, etc. may be added to the PPE resin composition of the present invention.

If necessary, a heat stabilizer may be used and, with regard to the heat stabilizer, it is possible to add zinc oxide, zinc sulfide, stabilizer of a phosphate type (such as Mark 2112, PEP 36, PEP 45, etc. manufactured by Asahi Denka) or stabilizer of a hindered phenol type (such as Irganox 1010 manufactured by Asahi Denka) from an extruder supply hopper or a side feeder. Preferred range of the heat stabilizer used in the present invention is 0.05 to 2.0 part(s) by weight and more preferably 0.1 to 1.5 part(s) by weight.

Those additives may be used jointly or singly. With regard to the supplying position, it is possible to add from any of an extruder supply hopper and a side feeder.

EXAMPLES

The present invention will be illustrated in greater detail with reference to the following Examples, but the invention should not be construed as being limited thereto.

Examples and Comparative Examples of Table 1, Table 2 and Table 3 were conducted according to the following conditions.

With regard to a co-rotating twin screw extruder, that of ZSK-70 (extruder length; 12 barrels, L/D=45) manufactured by Coperion (formerly, Werner & Pfleiderer) (Germany) was used. The extruder was placed on the first floor of a building.

Screw configuration and barrel configuration are as follows.

No. 1 barrel; First supplying inlet port
No. 2 to 3 barrels: Conveying zone
No. 4 barrel: First kneading zone
No. 5 barrel; First vacuum vent
No. 6 barrel: Second supplying inlet port (side feed barrel)
No. 7 barrel; Second kneading zone
No. 8 barrel: Third supplying inlet port
No. 9 barrel; Third kneading zone
No. 10 barrel: Second vacuum vent No. 11 barrel: Barrel for liquid additives; kneading zone for liquid additives No. 12 barrel: Closed barrel Screen changer: Screen changer of a plate type Mesh: 50#/20#/80#/20#

Die head: 50 holes of 4 mm diameter

Strand bath: Water temperature of 40° C.±3° C.

Pelletizer: column shape, aimed to 3.0±0.5 mm

Vibrating classifier: long pellets, pellets where particles are connected and cut dust are removed thereby The constitution of the first kneading zone was made by an appropriate combination of forward pitch-kneading block(s) and neutral pitch-kneading block(s) (refer to Patent Documents 4 and 5). Since a melt sealing is to be done between Nos. 6 and 7, reverse pitch-kneading block was inserted. In the second and the third kneading zones, forward pitch-kneading block(s), neutral pitch-kneading block(s) and reverse pitch-kneading block(s) were appropriately combined. In a liquid flame retardant kneading zone of No. 11 barrel, two single-flight reverse pitch-cut screw elements manufactured by Coperion were used. The screw speed was set at 600 rpm.

The physical properties of the PPE 1 used were as follows; Mw/Mn, 2.9; reduced viscosity, 0.510; average particle size, 523 μm; and static bulk density, 520 kg/m$^3$.

The physical properties of the PPE resin 2 used were as follows: Mw/Mn, 2.9; reduced viscosity, 0.510; average particle size, 50 μm; and static bulk density, 650 kg/m$^3$.

In the HIPS 1 used, rubber average particle size was 1.55 μm, rubber concentration was 10.2% by weight and MFR was 2.7 g/10 minutes (loaded with 5 kg at 200° C.). In the HIPS 2 used, rubber average particle size was 1.55 μm, rubber concentration was 12.3% by weight and MFR was 2.5 g/10 minutes (loaded with 5 kg at 200° C.). In the GPPS used, MFR was 2.1 (loaded with 5 kg at 200° C.).

With regard to a stabilizer, a master batch (GPPS 1/zinc oxide/PEP 36 (a phosphate-type stabilizer manufactured by Asahi Denka)=70/15/15) was used.

As flame retardant 1, 2,2-bis{4-[bis(phenoxy)phosphoryloxy]phenyl}propane (trade name; CR 741 manufactured by Daihachi Kagaku) was heated at 80° C. and used. As flame retardant 2, triphenyl phosphate in its solid state was used. As polyethylene, a low-density polyethylene M 1804 manufactured by Asahi Kasei Chemicals was used. As a hydrogenated styrene-butadiene block copolymer, H 1272 manufactured by Asahi Kasei Chemicals was used. As a glass fiber, a chopped strand having a diameter of 13 μm was used.

The PPE 1 powder in a 500-kg flexible container was supplied into a stock hopper of 2 m$^3$ and charged from the stock hopper to a feeder hopper to an extent of 200 kg of refill amount. Nitrogen purge was conducted to a PPE powder stock hopper and setting was conducted to make oxygen concentration 6% by weight. Nitrogen purge was also conducted to the first supplying inlet port hopper and setting was conducted so as to make oxygen concentration in the first supplying inlet port hopper 3.2% by weight.

The first supplying inlet port hopper was in an angular form as shown in FIG. 2 having a slope where wall angle at gear box side and die side was 75°. A piping layout of the upper part of the first supplying hopper is in the order of PPE supplying pipe, vent gas pipe and polystyrene supplying pipe from the gear box side to down stream. With regard to a loss-in-weight feeder of an extruder supply opening, two loss-in-weight feeder where one is for PPE powder and the other is for polystyrene pellets were prepared. The screw of the loss-in-weight feeder for powder was an intermeshing co-rotating twin screw. The screw of a feeder for polyethylene resin was an auger type. With regard to the second and the third supplying inlet ports, two movable weight feeders were prepared. With regard to a feeder for a liquid flame retardant, a loss-in-weight feeder was prepared where a pump was a gear pump and tank, pipe and pump were heated at 80° C. Liquid adding nozzle was installed in a barrel 11 at all times. With regard to a feeder for a solid flame retardant, a solid flame retardant by using a loss-in-weight feeder was set so as to be able to come into the second supplying inlet port barrel. The absolute pressure of a vacuum vent of an extruder was made 150 mmHg for barrel No. 5 and 350 mmHg for barrel No. 9. Incidentally, nitrogen purge of 1 m$^3$/H was conducted for a side feeder hopper orifice and vacuum vent port as well.

With regard to a screen changer, a screen changer of a plate type was used. An effective filtration area of a breaker cover of the screen changer was 150 cm$^2$ and, with regard to metal mesh, a metal mesh where No. 50, No. 20, No. 80 and No. 20 were combined was attached to a breaker cover.

As a die plate, a die plate having 50 holes of 4 mm diameter was used.

The length of a strand bath was 5 m, strand water was adjusted to 40° C., strand was dipped in a strand water to an extent of 4 m and cooled with air, water attached to the surface of the strand was blown away by an air wiper, an inlet temperature of pelletizer of strand was set at 130° C. and cutting was conducted where the aimed pellet size was 3 mm.

After that, pellets where particles were connected, long pellets and cut dust were separated to produce column-shaped pellets in which 98% by weight was about 2.5×3.5 mm.

With regard to a coloring property of the pellets, pellets were compression molded at 250° C. using a press metal mold of inner size of 160×160 mm and thickness of 1 mm and the numbers of foreign substances of 300 μm or more in the molded product were counted.

With regard to the physical properties of the pellet, fluidity was measured by means of a melt flow rate (MFR at 250° C. with a load of 10 kg; ASTM D 1238) and pellets were subjected to an injection molding machine (nozzle temperature: 240 to 320° C.; metal mold temperature: 50 to 100° C.) to prepare ¼-inch molded pieces using a metal mold of the ASTM method and a 18.6-kg load heat distortion temperature (deflection temperature under load (hereinafter, referred to as DTUL) (ASTM D 648) and Izod (ASTM D 258) were measured.

Examples and Comparative Examples of Table 4 were carried out under the following conditions.

As an extruder, a co-rotating twin screw extruder ZSK 58 megacompounder (9 barrels) manufactured by Coperion was used.

Screw configuration and barrel configuration are as follows.

No. 1 barrel: First supplying inlet port

No. 2 to No. 5 barrels: Conveying zone

No. 6 barrel: First kneading zone

No. 7 barrel: First vacuum vent

No. 8 barrel: Barrel for addition of liquid additives; kneading zone for liquid additives No. 9 barrel: Closed-barrel Screen changer: Screen changer of a plate type Mesh: 50#/20#/80#/20#

Die head: 30 holes of 4 mm diameter

Strand bath: water temperature of 40° C.±3° C.

Pelletizer: column; aimed to 2.5±0.3 mm

Vibrating classifier: long pellets, pellets where particles are connected and cut dust are removed thereby PPE concentrate was placed in a stock hopper and polystyrene resin was appropriately blended with M 1804 and H 1272 and placed in a stock hopper for polystyrene resin. A flame retardant was placed in a tank heated at 80° C. Temperature set for the barrel was made 250 to 320° C. The screw speed was made 500 rpm.

A process for producing a PPE resin composition by a single melt-kneading will be illustrated by referring to Examples and Comparative Examples of Tables 1 and 2.

EXAMPLE 1

Composition and feeding rate are mentioned in Example 1 of Table 1. Extruded amount was 1,100 kg/H and screw speed was 600 rpm. PPE1 was used as PPE, HIPS1 was used as HIPS, and flame retardant 1 was used as a flame retardant. HIPS-TOP and a stabilizer were blended and supplied from an extruder supply hopper, HIPS-SIDE, M1804 and H1272 were blended and supplied from a side feed 2 and a flame retardant 1 was supplied from a barrel 11.

The result was that the supply of the PPE powder was stable and physical properties were satisfactory as well.

COMPARATIVE EXAMPLE 1

The same operation as in Example 1 was conducted except that vent pipe and PPE powder supplying pipe were changed.

The result was that, since PPE powder clogged a supplying hopper, operation was conducted by lowering the total extruding amount to 700 kg/H where PPE powder was stabilized. The physical properties were deteriorated as compared to Example 1.

COMPARATIVE EXAMPLE 2

The same operation as in Example 1 was conducted except that positions of PPE powder supplying pipe and polystyrene resin supplying pipe were changed.

The result was that, since PPE powder clogged a supplying hopper, operation was conducted by lowering the total extruding amount to 800 kg/H where PPE powder was stabilized. The physical properties were deteriorated as compared to Example 1.

COMPARATIVE EXAMPLE 3

The same operation as in Example 1 was conducted except that angle of a supplying pipe was made 55°.

The result was that, since PPE powder stored in the wall of the hopper, supply amount of PPE powder was not stable and surging took place.

COMPARATIVE EXAMPLE 4

The same operation as in Example 1 was conducted except that vent of an extruder supply hopper of Example 1 was closed.

The result was that, since PPE powder clogged the supplying hopper, operation was conducted by lowering the total extruding amount to 400 kg/H where PPE powder was stabilized. The physical properties were deteriorated as compared to Example 1.

EXAMPLE 2

The same operation as in Example 1 was conducted except that PPE1 of Example 1 was changed to PPE2.

The result was that the supply of PPE powder was stable as same as in Example 1 and the physical properties were good as well.

EXAMPLE 3

The same operation as in Example 1 was conducted except that nitrogen purge of a stock hopper of Example 1 was not conducted.

The oxygen concentration of the supplying hopper was high to such an extent of high concentration of oxygen in a stock hopper whereby foreign substances were more than those in Example 1.

EXAMPLE 4

The same operation as in Example 1 was conducted except that composition was changed to Example 4 of Table 2.

The result was that the supply of PPE powder was stable as same as in Example 1 and the physical properties were good as well.

EXAMPLE 5

The same operation as in Example 1 was conducted except that the composition was changed from Example 1 to Example 5 of Table 2, HIPS-TOP, GPPS and stabilizer were blended and supplied to a polystyrene resin stock hopper, a solid flame retardant 2 was used as a flame retardant and HIPS-SIDE was supplied from side feed 2.

The result was that the supply of PPE powder was stable as same as in Example 1 and the physical properties were good as well.

EXAMPLE 6

The same operation as in Example 1 was conducted except that the composition was changed from Example 1 to Example 6 of Table 2, HIPS-TOP, GPPS and stabilizer were blended and supplied to a polystyrene resin stock hopper.

The result was that the supply of PPE powder was stable as same as in Example 1 and the physical properties were good as well.

EXAMPLE 7

The same operation as in Example 1 was conducted except that the composition was changed from Example 1 to Example 7 of Table 2, GPPS, maleic acid anhydride and stabilizer were blended and supplied to a polystyrene resin stock hopper, HIPS-SIDE was changed to side feed 1 and glass fiber was used as a side feed 2.

The result was that the supply of PPE powder was stable as same as in Example 1 and the physical properties were good as well.

EXAMPLE 8

The same operation as in Example 7 was conducted except that the composition was changed from Example 1 to Example 8. The result was that the supply of PPE powder was stable as same as in Example 7 and physical properties were good as well.

In accordance with a process of the present invention, a PPE resin composition where PPE powder conveying ability is excellent, productivity is high, impact resistance and fluidity were excellent and foreign substances were little could be produced in a single melt-kneading.

Now, a process for producing a PPE resin composition via a PPE concentrate will be illustrated by referring to Examples and Comparative Examples in Tables 3 and 4.

EXAMPLE 9

The same operation as in Example 1 was conducted except that composition was Example 9 of Table 3, a screw configuration of an extruder was that all side feeders were detached, the first kneading zone was transferred to a barrel 9, side feed kneading zone was detached and HIPS2 was used as HIPS and used by blending with a stabilizer.

The result was that the supply of PPE powder was stable and the physical properties were good as well.

COMPARATIVE EXAMPLE 5

The same operation as in Example 9 was conducted except that positions of PPE powder supplying pipe and vent pipe of Example 9 were changed.

The result was that the supply of PPE was unstable and extruding amount was lowered to such an extent that PPE powder was stabilized. The physical properties also deteriorated as compared to Example 9.

EXAMPLE 10

The same operation as in Example 1 was conducted except that composition was Example 10 of Table 3, a blend of GPPS, HIPS2 and stabilizer was supplied to an extruder supply hopper and HIPS2 was supplied from a side feed 2.

The result was that the supply of PPE powder was stable and the physical properties were good as well.

COMPARATIVE EXAMPLE 6

The same operation as in Example 10 was conducted except a composition which was Comparative Example 6 of Table 3.

The result was that the supply of PPE powder was stable and the physical properties were good as well.

EXAMPLE 11

The same operation as in Example 1 was conducted except that composition was Example 11 of Table 3, side feeder and screw configuration were returned to Example 1, a blend of GPPS, HIPS2 and stabilizer was supplied to an extruder supply hopper, a flame retardant 1 was supplied from a flame retardant side 1, HIPS2 was supplied from a side feed and a flame retardant 1 was supplied from a flame retardant side 2.

The result was that the supply of PPE powder was stable and the physical properties were good as well.

EXAMPLE 12

The same operation as in Example 1 was conducted except that composition was Example 12 of Table 3, a blend of GPPS, HIPS2 and stabilizer was supplied to an extruder supply hopper, a flame retardant 1 was supplied from a flame retardant side 1, HIPS2 was supplied from a side feed and a flame retardants was supplied from a flame retardant side 2.

The result was that the supply of PPE powder was stable and the physical properties were good as well.

Numbers a to f are assigned to the PPE concentrates prepared in Examples and Comparative Examples of Table 3, and Examples and Comparative Examples of Table 4 were conducted.

EXAMPLE 13

As to a PPE concentrate, "a" of Example 9 was used, GPPS, HIPS1, M1804 and H1282 were blended and the composition was adjusted so as to make the same composition as in Example 6.

The result was nearly the same as that in Example 6 and good.

COMPARATIVE EXAMPLE 7

The same operation as in Example 13 was conducted except that a PPE concentrate was changed to "b".

The result was that, as compared to Example 13, the physical properties were deteriorated.

EXAMPLE 14

The same operation as in Example 13 was conducted except that a PPE concentrate was changed to "c".

COMPARATIVE EXAMPLE 8

The same operation as in Example 14 was conducted except that a PPE concentrate was changed to "d".

The result was that, as compared to Example 14, the physical properties were greatly deteriorated.

EXAMPLE 15

The same operation as in Example 13 was conducted except that a non-flame retarding PPE concentrate "c" and a flame retarding PPE concentrate "e" were used so as to make the composition same as that of Example 1.

The result was that the physical properties were as good as those of Example 1.

EXAMPLE 16

The same operation as in Example 13 was conducted except that a non-flame retarding PPE concentrate "c" and a flame retarding PPE concentrates "e" and "f" were used so as to make the composition same as that of Example 1.

The result was that the physical properties were as good as those of Example 1.

EXAMPLE 17

The same operation as in Example 13 was conducted except that a non-flame retarding PPE concentrate "a" was used so as to make the composition same as that of Example 1 and an flame retardant was side-fed.

The result was that the physical properties were as good as those of Example 1.

EXAMPLE 18

The same operation as in Example 13 was conducted except that a non-flame retarding PPE concentrate "a" with a target of a composition where heat distortion temperature was 90° C. and a flame retardant was side-fed.

The result was that the physical properties were as good as those of Example 17.

In accordance with the process of the present invention, it is possible to produce a PPE resin composition by melt-kneading via a PPE concentrate where PPE powder conveying ability is excellent, productivity is high, impact resistance and fluidity are excellent and amount of foreign substances is little.

TABLE 1

|  | Ex 1 | CE 1 | CE 2 | CE 3 | CE 4 | Ex 2 | Ex 3 |
|---|---|---|---|---|---|---|---|
| Method of supplying PPE | fc/sh | fc/sh | fc/sh | fc/sh | fc/sh | fc/sh | fc/sh |
| PPE supplying pipe | gb-s | mw | d-s | gb-s | gb-s | gb-s | gb-s |
| Degassing pipe | mw | gb-s | mw | mw | mw(c) | mw | mw |
| Stock hopper - N₂ purge | o | o | o | o | o | o | x |
| Stock hopper - oxygen concentration | 7.0 | 7.0 | 7.0 | 7.0 | 7.0 | 7.0 | 21.0 |
| PS supplying pipe | d-s | d-s | gb-s | d-s | d-s | d-s | d-s |
| PPE species | 1 | 1 | 1 | 1 | 1 | 2 | 2 |
| PPE | 60 | 60 | 60 | 60 | 60 | 60 | 60 |
| HIPS-TOP | 12 | 12 | 12 | 12 | 12 | 12 | 12 |
| Stabilizer | 1 | 1 | 1 | 1 | 1 | 1 | 1 |
| HIPS-SIDE | 14 | 14 | 14 | 14 | 14 | 14 | 14 |
| M 1804 | 2 | 2 | 2 | 2 | 2 | 2 | 2 |
| H 1272 | 2 | 2 | 2 | 2 | 2 | 2 | 2 |
| Flame retardant | 10 | 10 | 10 | 10 | 10 | 10 | 10 |
| Hopper angle (°) | 75 | 75 | 76 | 55 | 75 | 75 | 75 |
| Oxygen concentration (% by weight) | 3.2 | 3.2 | 3.2 | 3.2 | 3.2 | 3.2 | 5.3 |
| Foreign substances | 0 | 20 | 15 | — | — | — | 4 |
| Operation stability | stable | *1 | *1 | *2 | *3 | stable | stable |
| Stable extruding amount (kg/H) | 1100 | 700 | 800 | *4 | 400 | 1100 | 1100 |
| Screw speed (rpm) | 600 | 600 | 600 | 600 | 600 | 600 | 600 |
| Physical Properties |  |  |  |  |  |  |  |
| Izod (J/m) | 214 | 145 | 157 | — | 93 | 243 | 201 |
| Heat distortion temperature (° C.) | 120 | 119.8 | 120.3 | — | 120 | 120 | 119.7 |
| MFR (at 250° C., 10-kg load) | 5.2 | 3.6 | 4.1 | — | 3.1 | 4.5 | 5.0 |

Ex: Example,
CE: Comparative Example,
fc: flexible container,
sh: stock hopper,
gb-s: gear box side,
d-s: die side,
mw: midway,
(c): (closed),
o: done,
x: not done,
*1: powder was clogged due to poor degassing,
*2: powder accumulation was generated,
*3: powder was blown out from extruder supply hopper,
*4: operation was impossible

TABLE 2

|  | Ex 4 | Ex 5 | Ex 6 | Ex 7 | Ex 8 |
|---|---|---|---|---|---|
| Method of supplying PPE | fc/sh | fc/sh | fc/sh | fc/sh | fc/sh |
| PPE supplying pipe | gb-s | gb-s | gb-s | gb-s | gb-s |
| Degassing pipe | mw | mw | mw | mw | mw |
| Stock hopper - N₂ purge | o | o | o | o | o |
| Stock hopper - oxygen concentration | 7.0 | 7.0 | 7.0 | 7.0 | 7.0 |
| PS supplying pipe | d-s | d-s | d-s | d-s | d-s |
| PPE species | 1 | 1 | 1 | 1 | 1 |
| PPE | 65 | 40 | 43 | 28 | 45 |
| HIPS-TOP (HIPS1) | 8 | 9 | 10 | 0 | 0 |
| GPPS | 0 | 8 | 5 | 20 | 18 |
| MAH | 0 | 0 | 0 | 0.1 | 0.1 |
| Stabilizer | 1 | 1 | 1 | 1 | 1 |
| HIPS-SIDE (HIPS1) | 10 | 30 | 39 | 21 | 9 |
| M 1804 | 2 | 0 | 1 | 0 | 0 |
| H 1272 | 2 | 0 | 1 | 0 | 0 |
| Glass fiber | 0 | 0 | 0 | 30 | 20 |
| Flame retardant | 12 | 14 | 0 | 0 | 0 |
| Hopper angle (°) | 75 | 75 | 75 | 75 | 75 |
| Oxygen concentration (% by weight) | 3.2 | 3.2 | 3.2 | 3.2 | 3.2 |
| Foreign substances | 0 | 0 | 0 | 0 | 0 |
| Operation stability | stable | stable | stable | stable | stable |
| Stable extruding amount (kg/H) | 1100 | 1200 | 1200 | 1025 | 1000 |
| Screw speed (rpm) | 600 | 600 | 600 | 450 | 450 |
| Physical Properties |  |  |  |  |  |
| Izod (J/m) | 170 | 245 | 234 | 106 | 90 |
| Heat distortion temperature (° C.) | 120 | 85 | 118 | 132 | 134 |

TABLE 2-continued

|  | Ex 4 | Ex 5 | Ex 6 | Ex 7 | Ex 8 |
|---|---|---|---|---|---|
| MFR (at 250° C., 10-kg load) | 5.1 | 47 | 5.2 | 3.2 | 3.2 |

Ex: Example,
fc: flexible container,
sh: stock hopper,
gb-s: gear box side,
mw: midway,
o: done,
d-s: die side

TABLE 3

(Examples of Steps for Concentrate)

|  | Ex 9 | CE 5 | Ex 10 | CE 6 | Ex 11 | Ex 12 |
|---|---|---|---|---|---|---|
| Concentrate species | a | b | c | d | e | f |
| PPE supplying method | fc/sh | fc/sh | fc/sh | fc/sh | fc/sh | fc/sh |
| PPE supplying pipe | gb-s | mw | gb-s | gb-s | gb-s | gb-s |
| Degassing pipe | mw | gb-s | mw | mw | mw | mw |
| Stock hopper - N₂ purge | o | o | o | o | o | o |
| Stock hopper - oxygen concentration | 7.0 | 7.0 | 7.0 | 7.0 | 7.0 | 7.0 |
| PS supplying pipe | d-s | d-s | d-s | d-s | d-s | d-s |
| PPE species | 1 | 1 | 1 | 1 | 1 | 1 |
| PPE | 85 | 85 | 70.0 | 18.0 | 80.0 | 80.0 |
| GPPS |  |  | 4.0 | 10.0 | 4.0 | 4.0 |
| HIPS-TOP (HIPS2) | 14 | 14 | 5.0 | 5.0 | 5.0 | 5.0 |
| Stabilizer | 1.0 | 1.0 | 1.0 | 1.0 | 1.0 | 1.0 |
| Flame retardant SIDE 2 |  |  |  |  | 21.0 |  |
| HIPS-SIDE (HIPS2) |  |  | 20.0 | 66.0 | 10.0 | 10.0 |
| Flame retardant SIDE 2 |  |  |  |  | 22 | 10.0 |
| Hopper angle (°) | 75 | 75 | 75 | 75 | 75 | 75 |
| Oxygen concentration (% by weight) | 3.2 | 3.2 | 3.2 | 3.2 | 3.2 | 3.2 |
| Foreign substances | 0 | 20 | 0 | 0 | 0 | 0 |
| Operation stability | stable | *1 | stable | stable | stable | stable |
| Stable extruding amount (kg/H) | 900 | 420 | 1100 | 1500 | 1200 | 400 |
| Screw speed (rpm) | 600 | 600 | 600 | 600 | 1000 | 600 |
| Physical properties |  |  |  |  |  |  |
| Izod (J/m) | 120 | 86 | 100 | 65 | 32 | 85 |
| Heat distortion temperature (° C.) | 163 | 162 | 147 | 96 | 78 | 129 |
| MFR (at 250° C., 10-kg load) | 0.2 | 0.1 | 0.7 | 24.2 | 60 | 3.7 | fc: flexible container,
sh: stock hopper,
gb-s: gear box side,
mw: midway,
o: done,
d-s: die side,
*1: poor degassing

TABLE 4

(Examples for Second Step)

|  | Ex 13 | CE 7 | Ex 14 | CE 8 | EX 15 | Ex 16 | Ex 17 | Ex 18 |
|---|---|---|---|---|---|---|---|---|
| a | 50.6 | 0 | 0 | 0 | 0 | 0 | 70.5 | 56.5 |
| b | 0 | 50.6 | 0 | 0 | 0 | 0 | 0 | 0 |
| c | 0 | 0 | 25.7 | 0 | 59 | 15.3 | 0 | 0 |
| d | 0 | 0 | 0 | 100 | 0 | 0 | 0 | 0 |
| e | 0 | 0 | 0 | 0 | 33.3 | 16.7 | 0 | 0 |
| f | 0 | 0 | 0 | 0 |  | 55.0 | 0 | 0 |
| HIPS-TOP | 44.4 | 44.4 | 63.7 | 0 | 3.7 | 9.0 | 15.5 | 20.5 |
| GPPS-TOP | 5.0 | 5.0 | 9.0 | 0 | 0 | 0 | 0 | 0 |
| M 1804 | 1.0 | 1.0 | 1.0 | 1.0 | 2.0 | 2.0 | 2.0 | 2.0 |
| H 1272 | 1.0 | 1.0 | 1.0 | 1.0 | 2.0 | 2.0 | 2.0 | 2.0 |
| Flame Retardant | 0 | 0 | 0 | 0 | 0 | 0 | 10.0 | 19.0 |
| PPE | 43.0 | 43.0 | 17.6 | 17.6 | 59.9 | 60.0 | 59.9 | 48 |
| GPPS | 5.0 | 5.0 | 9.8 | 9.8 | 3.3 | 3.0 | 0 | 0 |
| HIPS | 49.5 | 49.5 | 69.6 | 69.6 | 22.0 | 22.2 | 25.4 | 28.4 |
| Stabilizer | 0.5 | 0.5 | 1.0 | 1.0 | 0.8 | 0.8 | 0.7 | 0.6 |
| Flame Retardant | 0 | 0 | 0 | 0 | 10.0 | 10.0 | 10.0 | 19.0 |
| M 1804 | 1.0 | 1.0 | 1.0 | 1.0 | 2.0 | 2.0 | 2.0 | 2.0 |
| H 1272 | 1.0 | 1.0 | 1.0 | 1.0 | 2.0 | 2.0 | 2.0 | 2.0 |
| Izod (J/m) | 220 | 165 | 9.6 | 4.7 | 195 | 198 | 212 | 168 |
| Heat distortion Temp (° C.) | 120 | 120 | 95 | 95 | 120 | 120 | 120 | 91 |
| MFR (at 250° C., 10-kg load) | 5.0 | 4.1 | 23.9 | 21.4 | 5.3 | 5.2 | 5.2 | 32 |

Ex: Example,
CE: Comparative Example

A process of producing a PPE resin composition according to the present invention is suitable in the field where a PPE resin composition is produced by melt-kneading of PPE powder. In addition, a PPE resin composition prepared thereby is suitable in the field of electronic and electric materials and the field of materials for automobiles.

While the present invention has been described in detail and with reference to specific embodiments thereof, it will be apparent to one skilled in the art that various changes and modifications can be made therein without departing from the spirit and scope thereof.

What is claimed is:

1. A process for producing a polyphenylene ether (hereinafter referred to as "PPE") resin composition containing PPE powder using an extruder comprising:
    a PPE powder supplying pipe;
    a vent pipe;
    an extruder supply hopper comprising having opposing upper and lower parts, an opening on the upper part, and a gear-box side wall with a wall angle of 60° to 85°;
    an extruder unit; and
    at an upper part of the PPE powder supplying pipe, an equipment comprising a PPE powder stock hopper, a conveying part, and a loss-in-weight feeder for PPE powder, connected in this order from the upside,
    wherein the PPE powder supplying pipe has a terminal orifice located in the opening of the extruder supply hopper, which is on the upper part thereof, and is disposed at a gear box-side portion of the extruder supply hopper; and
    wherein the vent pipe has a terminal orifice located in the opening of the extruder supply hopper, which is on the upper part thereof, and is disposed at a die-side portion, relative to the PPE powder supplying pipe, of the extruder supply hopper, the process comprising:

allowing the PPE powder to pass through the PPE stock hopper, the conveying part, the PPE powder loss-in-weight feeder and the PPE powder supplying pipe in this order from upside to downside and supplying the PPE powder to the gear box-side wall of the extruder supply hopper, the wall angle being 60 to 85°;

removing a gas accompanying the PPE powder in an effective amount through the vent pipe; and melt-kneading the PPE powder supplied to the extruder unit from the extruder supply hopper at a kneading zone where L is 2D or more and then removing a gas in an effective amount from a vent port disposed at a die side of the kneading zone, wherein the PPE powder stock hopper is regulated to have an oxygen concentration of less than 15% by weight and the extruder supply hopper is regulated to have an oxygen concentration of less than 6% by weight.

2. The process of claim 1, wherein the PPE resin composition comprises 20 to 99 parts by weight of PPE powder and 80 to 1 part(s) by weight of at least one kind of thermoplastic resin other than PPE, and the at least one kind of thermoplastic resin other than PPE is supplied separately from the PPE powder by a separate supplying pipe from a die side portion relative to the vent pipe in the extruder supply hopper or from a lower side portion of the extruder supply hopper.

3. The process of claim 2 adapted to produce a PPE resin composition comprising 20 to 99 parts by weight of PPE powder and 80 to 1 part(s) by weight of a polystyrene resin, comprising the steps of:

supplying the whole amount of the PPE powder and a part of the polystyrene resin from the extruder supply hopper; and supplying the residual polystyrene resin from at least one side feed inlet port, wherein the supply amount of the polystyrene resin is adjusted such that the amount of the PPE powder accounts for 51 parts by weight or more per 100 parts by weight of the total amount of the PPE powder and the polystyrene resin supplied from the extruder supply hopper, and wherein the melt-kneading to obtain the PPE resin composition is effected by one extruding step.

4. The process of claim 2 adapted to produce a PPE resin composition comprising 3 to 30 parts by weight of a flame retardant per 100 parts by weight of the total amount of a resin comprising 20 to 99 parts by weight of PPE powder and 80 to 1 part(s) by weight of a polystyrene resin using an extruder, comprising the steps of:

supplying the whole amount of the PPE powder and a part of the polystyrene resin from the extruder supply hopper; and supplying the residual polystyrene resin and flame retardant from at least one side feed inlet port, wherein the amount of the polystyrene resin supplied from the extruder supply hopper is adjusted to 10 to 90 parts by weight per 100 parts by weight of the PPE powder.

5. The process of claim 2 adapted to produce a PPE resin composition concentrate comprising 51 to 99 parts by weight of PPE powder and 49 to 1 part(s) by weight of a polystyrene resin using an extruder, comprising the steps of:

supplying the whole amount of the PPE powder and a part of the polystyrene resin from the extruder supply hopper; and supplying the residual polystyrene resin from at least one side feed inlet port, wherein the amount of the polystyrene resin supplied from the extruder supply hopper is adjusted to 10 to 90 parts by weight per 100 parts by weight of the PPE powder.

6. The process of claim 5, further comprising supplying 6 to 50 parts by weight of a flame retardant per 100 parts by weight of the total amount of the resin which comprises 51 to 95 parts by weight of the PPE powder and 49 to 5 parts by weight of the polystyrene resin.

7. The process of claim 6, wherein the flame retardant is supplied from at least one side feed inlet port.

8. A process for producing a PPE resin composition, comprising melt-kneading 20 to 98 parts by weight of at least one kind of the PPE concentrate prepared by the process of claim 5 and 80 to 2 parts by weight of a polystyrene resin.

9. A process for producing a PPE resin composition, comprising melt-kneading 20 to 98 parts by weight of at least one kind of the PPE concentrate prepared by the process of claim 5, 80 to 2 parts by weight of a polystyrene resin, and 3 to 30 parts by weight of a flame retardant.

10. A process for producing a PPE resin composition, comprising melt-kneading 20 to 98 parts by weight in total of at least one kind of the PPE concentrate prepared by the process of claim 7 or a combination thereof with at least one kind of the PPE concentrate excluding the flame retardant, and 65 to 2 parts by weight of a polystyrene resin.

* * * * *